INVENTORS
WERNER FLIEG
WILBERN F. DAVIS
BY
ALAN K. ROBERTS
ATTORNEY

INVENTORS
WERNER FLIEG
WILBERN F. DAVIS
BY
ALAN K. ROBERTS
ATTORNEY

Dec. 6, 1966 W. FLIEG ETAL 3,290,507

PHOTOSENSITIVE DIGITAL OUTPUT APPARATUS OPERATIVE BY CLOCK MOVEMENT

Filed Feb. 15, 1963 3 Sheets-Sheet 3

INVENTORS
WERNER FLIEG
WILBERN F. DAVIS

BY

ALAN K. ROBERTS
ATTORNEY 3,290,507

PHOTOSENSITIVE DIGITAL OUTPUT APPARATUS OPERATIVE BY CLOCK MOVEMENT

Werner Flieg, Newton Center, and Wilbern F. Davis, Sharon, Mass., assignors to Invac Corporation, Waltham, Mass.

Filed Feb. 15, 1963, Ser. No. 258,810
7 Claims. (Cl. 250—215)

This invention relates to time indicating apparatus and the like, and more particularly to apparatus suitable for generating electrical signals as indications of measurements in time units and the like.

It is an object of the invention to provide an improved apparatus for measuring the lapse of time and providing signals indicative thereof.

It is a further object of the invention to provide improved techniques relating to measurements such as measurements of times, quantities and so forth.

It is still a further object of the invention to provide reliable long-life clock apparatus adapted for use with data processing devices.

Yet another object of the invention is to provide an improved digital clock.

Still a further object of the invention is to provide an improved digital clock having an output available for a duration of up to one second without requiring external storage.

A still further object of the invention is to provide an improved photoelectric digital clock.

Another object of the invention is to provide an electronic digital clock particularly suitable for automatic programing.

Yet another object of the invention is to provide an improved digital clock adapted especially for time recording.

Still another object of the invention is the provision of an improved digital clock adapted for recording time in connection with the recording of data.

Advantageously the apparatus of the invention is relatively small and light and requires simple conventional power sources.

As a further advantage of the invention, the digital clock may be provided which is relatively inexpensive.

As still a further advantage of the invention, the digital clock thereof is readily adapted for providing logical level outputs.

A feature of the invention is the elimination of all contacts, switches and stepped solenoids and other such components as may jeopardize prolonged use without danger of failure.

According to one preferred embodiment of the invention there is provided in association with a light source a means responsive to light from the source and light intercepting means adapted for displacement between the aforesaid source and said means according to a predetermined time pattern and having therein coded groups of holes to cause the generation of signals indicative of time measurements.

According to a further aspect of the invention apparatus is provided comprising means for moving a sequence of arrays of holes past a predetermined measuring point at a predetermined rate, and photoelectric means for inspecting the arrays of holes and generating electrical signals identifying the same.

According to a feature of the invention, there is provided apparatus comprising cyclically displaceable means which are interdependently displaceable and which are provided with time indications thereon, there being further provided transducer means responsive to the time indications for generating corresponding electrical signals.

According to a further feature of the invention, there is provided a sequencing apparatus comprising, for example, a rotatable disc having holes distributed angularly about the axis thereof and at different distances from this axis, there being further provided photoelectric means arranged in positions to detect the presence of the aforesaid holes in order to generate corresponding sequencing signals.

A further feature of the invention relates to a power mechanism by means of which the rotation of different discs are made dependent upon one another so that for example a minute disc can be employed to step an hour disc once upon each complete rotation of the minute disc.

Other objects, features and advantages of the invention will be apparent from the following detailed description of one embodiment thereof as illustrated in the accompanying drawing in which.

Figure 1:
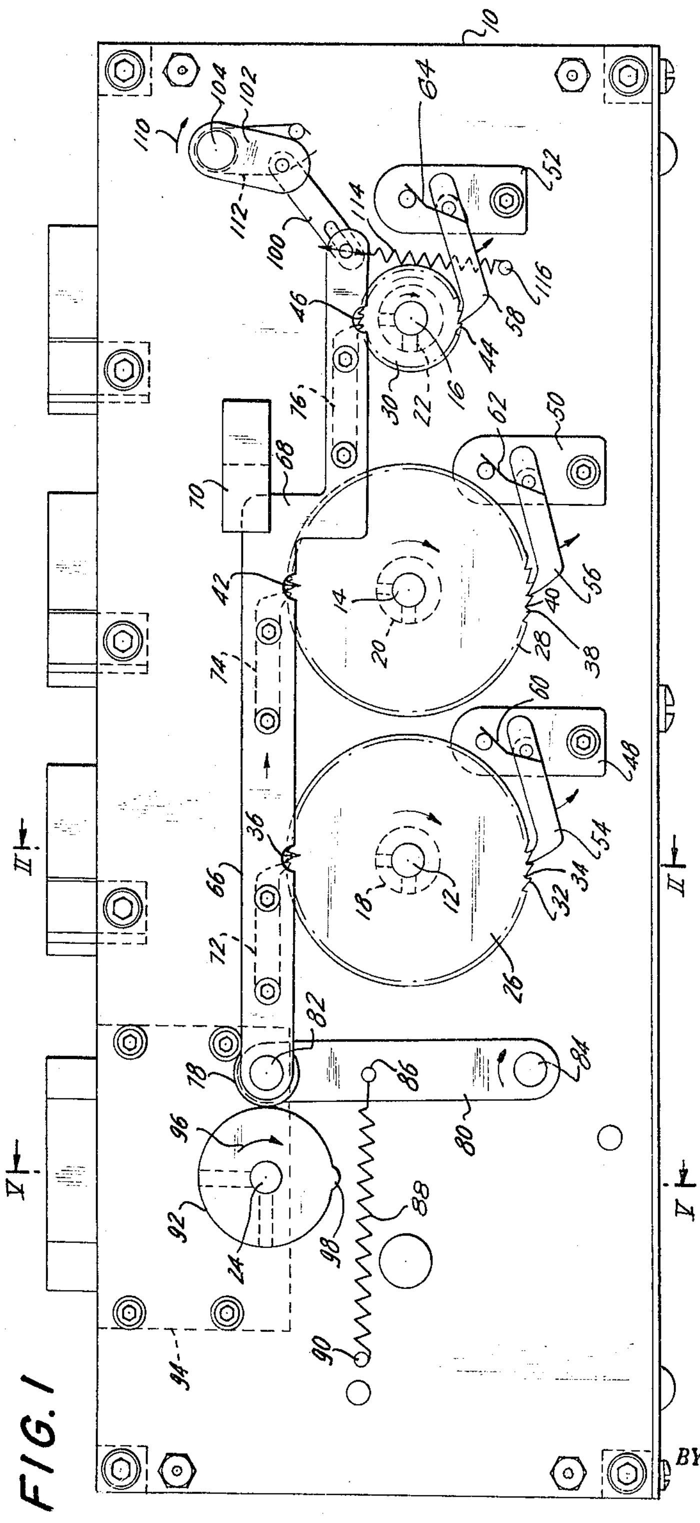
FIGURE 1 is a side view of a digital clock provided in accordance with one embodiment of the invention.

Referring first to FIGS. 1–5, the apparatus of the invention comprises generally a frame 10 having three parallel and coplanar shafts 12, 14 and 16 rotatably mounted thereon in bearings 18, 20 and 22.

A further shaft 24 is provided which is parallel to the first said shafts and spaced from the plane of the latter.

Mounted respectively on shafts 12, 14 and 16 and fixed for rotation therewith are ratchet wheels 26, 28 and 30. As will be seen more clearly hereinafter, wheel 26 is a second wheel, wheel 28 is a minute wheel and wheel 30 is an hour wheel.

Wheel 26 is provided with sixty evenly spaced teeth 32 having grooves 34 therebetween. All of said grooves 34 are of substantially equal depth with the exception of one groove indicated by reference character 36. This groove is of greater depth for a reason which will hereinafter be indicated in greater detail.

Wheel 28 is also provided with sixty evenly spaced peripheral teeth 38 having grooves 40 therebetween, said grooves also being of substantially equal depth with the exception of a single groove 42 which is of greater depth, also for a reason which will become apparent hereinafter.

Wheel 30 is provided with twenty-four evenly spaced peripheral teeth 44 having grooves 46 therebetween, all of said grooves without exception being of substantially equal depth.

Mounted on frame 10 by means of brackets 48, 50 and 52 are arresting pawls 54, 56 and 58. Said arresting pawls are respectively loaded by springs 60, 62 and 64 and are urged by these springs into engagement with wheels 26, 28 and 30 which they yieldingly hold in position.

Further comprised in the apparatus of the invention is an arm 66 of elongated configuration, said arm including a knee 68 accommodated in the groove of a bifurcated guide 70 which prevents lateral movement of said arm but permits a longitudinal movement thereof.

Pawls 72, 74 and 76 are mounted on the arm 66 and are respectively aligned with wheels 26, 28 and 30 for engagement with the teeth of the latter.

A roller 78 is affixed at one end of the arm 66 and at this end is moreover pivotally coupled a link 80 connected to pin 82. Link 80 is pivotally connected to frame 10 at the other extremity thereof by means of a pin 84. Intermediate the extremities of link 80 is provided a hole 86 in which is engaged one end of a spring 88, the other end of which is connected to a pin 90 mounted on the frame 10.

Said spring 88 yieldably draws link 80 to the left in FIG. 1 and pulls roller 78 against the periphery of a cam 92.

Cam 92 is mounted on the shaft 24 noted above. The cam 92 is fixed for rotation on shaft 24 which in turn is rotated by a synchronous motor 94 which is merely diagrammatically illustrated. In the preferred embodiment of the invention, the shaft 24 is rotated at a speed of one rotation per second, the direction of rotation being indicated by the arrow 96.

Cam 92 is provided with a single radial protrusion 98, the purpose of which is to engage roller 78 and urge this roller and the arm 66 to the right in FIG. 1.

The rightmost extermity of arm 66 is pivotally connected to a link 100 in turn pivotally connected to a link 102, the two links 100 and 102 cooperatively constituting a system by means of which the arm 66 can be elevated to withdraw one of the aforesaid pawls out of engagement with their respective wheels.

Figure 4:
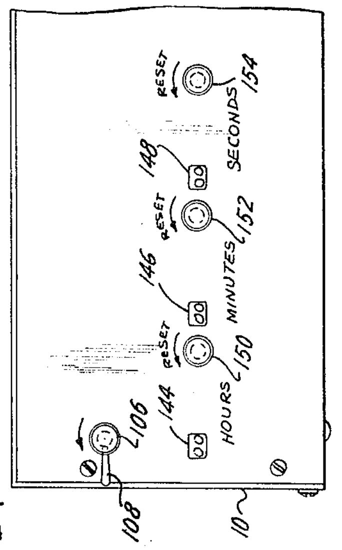
FIGURE 4 is a fragmentary view of the exterior casing of the digital clock of the invention.

To this end link 102 is mounted on a shaft 104 coupled to a control knob 106 provided with lever 108 (FIG. 4). Shaft 104 is rotatable in the direction of arrow 110 whereby the arm 66 is elevated as aforesaid. Links 100 and 102 are cooperatively spring-loaded by means of a spring 112 which, together with a spring 114 connected between arm 66 and pin 116 on frame 10, urges arm 66 and the pawls thereon towards the aforesaid ratchet wheels.

Figure 2:
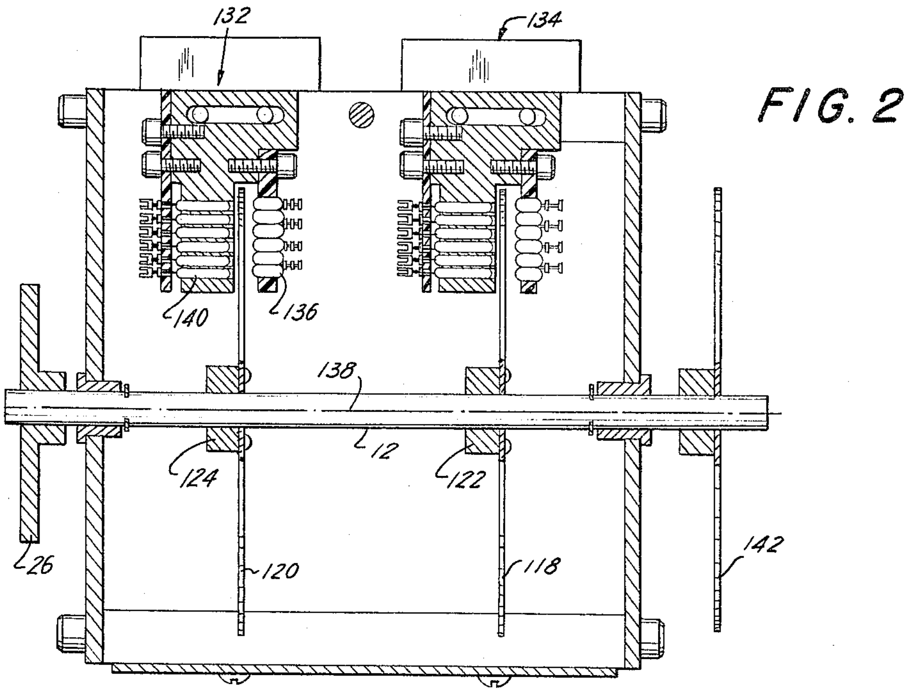
FIGURE 2 is a sectional view, taken along line II—II of FIG. 1, some of the parts being omitted for purposes of clarity.

Mounted on each shaft are a pair of discs respectively constituting units and tens discs. One such arrangement is illustrated in FIG. 2 wherein is seen the shaft 12 having ratchet wheel 26 mounted thereon. The units disc is, for example, the disc 118, whereas the tens disc is, for example, the disc 120. Said discs are affixed for rotation with the shaft 12 by means of hubs 122 and 124 respectively, said discs being at right angles to shaft 12 and in parallel relationship with one another.

Figures 3, 5:
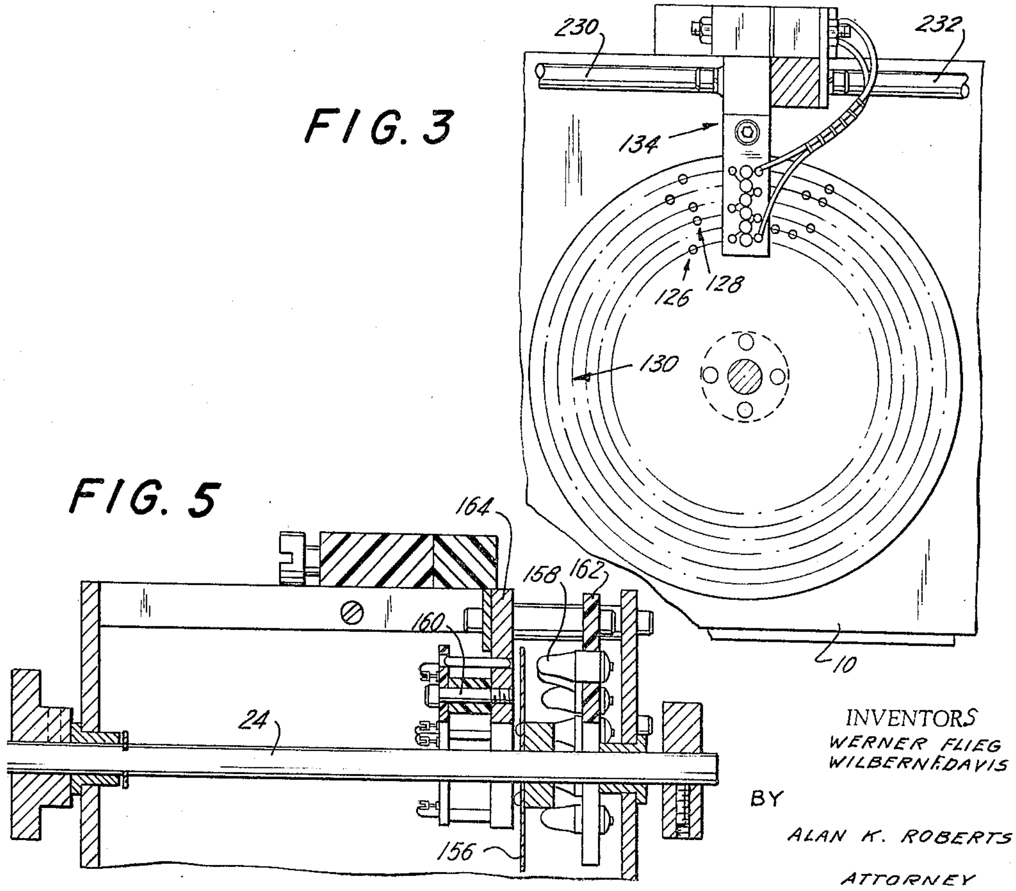
FIGURE 3 is a side view, partially broken away and and partially diagrammatic, illustrating a particularly important arrangement of components in the apparatus of FIG. 2.
FIGURE 5 is a sectional view, taken along line V—V of FIG. 1, with some of the parts being omitted for purposes of clarity.

As is best seen in FIG. 3, each disc is provided with a plurality of angularly displaced arrays of holes, each array being radially disposed with respect to the axis of the associated disc and shaft. One such array is indicated by reference character 126, whereas a second array is indicated by reference character 128. Imaginary circumferential lines 130 indicate the distances from the axis of the disc at which may be positioned (or not) holes, the combined presence or absence of which in particular positions in each array are intended to encode numbers in the well known binary technique to designate minutes or seconds or the like.

In FIGS. 2 and 3 are illustrated photoelectric scanning devices 132 and 134. Device 132, for example, comprises a radial array of lamps or light sources 136 radially disposed with respect to the axis 138 of shaft 12 and thereby adapted to radiate light through the aforesaid holes in the associated discs. Photoelectric devices 132 and 134 are arranged to straddle the associated discs 118 and 120 so that, for example, device 132 further comprises a radial array of photoelectric cells 140 also radially disposed with respect to axis 138 and in spaced and aligned relationship with respect to lamps 136.

From what has been stated above, it will now appear that photoelectric devices 132 and 134 are adapted to scan and inspect the discs associated therewith as said discs are rotated whereby the present and absence of holes in the associated discs may be ascertained.

Also illustrated by way of example in FIG. 2 is a disc 142 mounted on the shaft 12 for rotation therewith, said disc being provided with visible indicia or numbers related to arrays of holes on the discs 118 and 120 so that the time indicated by discs 118 and 120 may be visibly perceived.

Referring to FIG. 4, it is seen that the frame 10 is provided with openings 144 and 146 wherethrough are exposed members corresponding to the arrays of holes aligned with their respective photoelectric scanning devices.

The apparatus of the invention thus far described is capable of operating in and of itself to provide electrical signals indicating the passage of time.

For example, with shaft 24 rotating at a rate of one rotation per second, protrusion 98 on cam 92 engages roller 78 and displaces arm 66 to the right once each second.

Arm 66 is effective through pawl 72 to displace wheel 26 angularly through a distance corresponding to one tooth, this relationship being provided for by means of the height of protrusion 98.

The depth of grooves 34 in wheel 26 (and this excepts groove 36) and the degree to which pawl 72 extends from arm 66 is such as to keep pawl 74 from engaging the teeth on wheel 28 and the pawl 76 from engaging the teeth on wheel 30. This condition persists with wheel 26 being stepped by the breadth of one tooth once for each rotation of cam 92, until pawl 72 encounters groove 36 on wheel 26.

Movement of pawl 72 still causes corresponding rotation of wheel 26 but in addition pawl 74 is brought into engagement with teeth 38 on wheel 28. The depth of grooves 40 on wheel 28, however, is such that pawl 76 is maintained out of engagement with wheel 30 until groove 42 is encountered on wheel 28 whereafter pawl 76 is for the first time brought into engagement with teeth 34 on wheel 30.

From what has been stated above, it will now appear that for each single rotation of wheel 26 corresponding to the lapse of sixty seconds pawl 74 will be brought only a single time into engagement with wheel 28 to step the same by the breadth of one tooth and that for each single rotation of wheel 28 corresponding to the lapse of sixty minutes, pawl 76 will be brought but a single time into contact with the wheel 30.

The aforesaid arrays of holes on the discs mounted on shafts 12, 14 and 22 are arranged according to the well known binary coding techniques to represent hours, minutes and seconds and the presence or absence of the holes constituting the arrays are detected by the associated photoelectric devices.

To facilitate the initial set up and resetting of the mechanism described above, the system consisting of the aforesaid links 100 and 102 is brought into play. The knobs 150, 152 and 154 (FIG. 4) are mounted on shafts 12, 14 and 16 permitting the latter to be rotated freely with pawls 72, 74 and 76 disengaged from wheels 26, 28 and 30.

Before proceeding to an investigation of a circuit in which the aforesaid apparatus may be employed, it is convenient to note that the signals provided by the photoelectric devices discussed above may be employed in parallel or in sequence. In accordance with the invention there is further provided a sequencing device based upon the rotation of shaft 24 and illustrated in detail in FIG. 5.

In FIG. 5 is illustrated the shaft 24 which rotates as aforesaid at the rate of one rotation per second. Mounted on the shaft 24 for rotation therewith is a sequencer disc 156.

An array of lamps 158 and the photoelectric cells 160 are provided in a manner analogous to that described above, said lamps and photoelectric cells being supported by brackets 162 and 164 respectively.

The disc 156 is provided with a number of openings or holes positioned angularly about the axis of said disc and at different radial distances from said axis. As shaft 24 rotates, these holes sequentially expose selected of the cells 160 to the lamps 158 for the generation of a time sequence of signals, the sequence being repeated once for each rotation of shaft 24, or in other words, once each second.

Figure 6:
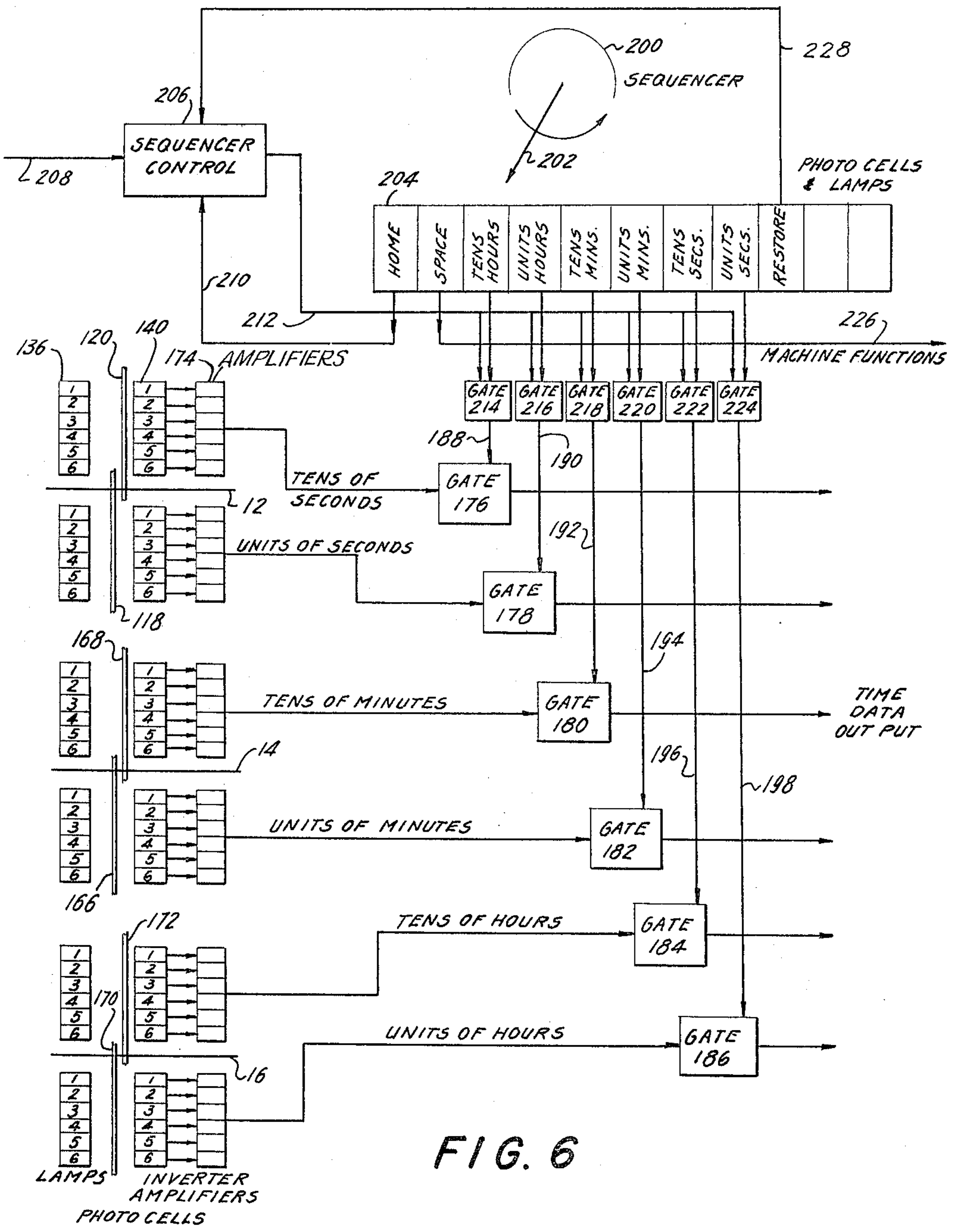
FIGURE 6 is a diagrammatic view of an electrical circuit embodying the apparatus of FIGS. 1—5 in accordance with the invention.

A circuit embodying the aforesaid apparatus is illustrated diagrammatically in FIG. 6 wherein are seen the shafts 12, 14 and 16 and the discs 118 and 120 mounted on shaft 12. Also illustrated are discs 166 and 168 mounted on shaft 14 and respectively bearing the arrays of holes designated units of minutes and tens of minutes. Further, shaft 16 is shown as bearing discs 170 and 172 having thereon the arrays of holes representing units and tens of hours.

To clarify the utilization of two discs on each shaft, it is to be noted that a single disc might be sufficient if the number of seconds, minutes and hours could always be represented by numbers consisting of single digits. However, this is not always the case and where two digits are required, two discs are preferably employed in accordance with the invention, although other arrangements requiring a closer spacing of the holes in the discs might be employed.

FIGURE 6 further illustrates banks of lamps 136 and photocells 140, the latter being coupled to amplifiers 174. Similarly, each of the remaining discs is provided with associated banks of lamps and photoelectric cells.

Each bank of amplifiers 174 is coupled to an associated gating circuit of conventional electrical construction well known to those skilled in the art. Each amplifier might be coupled to its own gate, but single gating circuits are illustrated in FIG. 6 for each bank of amplifiers for purposes of simplification. To this end there are illustrated gates 176 ,178, 180, 182, 184 and 186. Said gates are primed to pass the signal received from the associated banks of amplifiers by means of signals received respectively via lines 188, 190, 192, 194, 196 and 198 respectively.

The above described sequencing arrangement including disc 156 (FIG. 5) is diagrammatically illustrated in FIG. 6 in the form of signal source 200 and distributor 202 which provide a sequence of gating signals. The signals provided by source 200 are respectively indicated by blocks 204 (which may be regarded as photocells which cooperate with disc 156) to constitute the following signals: home, space, tens hours, units hours, tens minutes, units minutes, tens seconds, units seconds, and restore. "Home" is the signal indicating the position to which the sequencer returns after running through a sequence. "Space" is illustrative of a signal to control an external machine function such as, in this case, the spacing or stepping of a paper tape to receive the next time indication.

In cooperation with the apparatus of the invention there is provided a sequencer control circuit 206 which receives an externally applied signal via a line 208. The sequencer control circuit 206 further receives a signal from home via line 210.

Upon receipt of coincident signals from lines 208 and 210, the sequencer control circuit generates a signal which is transmitted via line 212 to gates 214, 216, 218, 220, 222 and 224 so that these gates are primed to pass signals received from distributor 202.

As a result of the aforesaid electrical control, gates 176–186 are respectively primed to transmit signals received from amplifier banks 174 so that the time indicating signals which are generated in parallel are transmitted in sequence.

External machine control, for example, space control for a typewriter, may, for example, be transmitted via line 226.

A sequence control circuit restoring signal may be transmitted via line 228 so that the control circuit 206 is reset to await the next external control signal.

In view of the precision required in correlating the aforesaid signals, the above noted photoelectric devices may be mounted on aligning rods, such as for example, the rods 230 and 232 illustrated in FIG. 3, and adjustably coupled to frame 10.

It will be noted from the description of the mechanical devices noted above that the wheel 30 is provided with a smaller diameter than the diameters of wheels 26 and 28, this accounting for the smaller number of teeth on wheel 30 whereby only a single protrusion 98 need be provided on cam 92.

There will now be obvious to those skilled in the art many modifications and variations of the structures set forth above. These modifications and variations will not, however, depart from the scope of the invention if defined by the following claims.

What is claimed is:

1. Apparatus comprising two shafts, ratchet wheels fixed on said shafts, a cam, an arm extending adjacent said wheels and engaging said cam, pawls on said arm and aligned with said wheels to engage the same, means engaging said arm to urge the pawls into engagement with the wheels, said wheels including evenly spaced peripheral teeth having grooves therebetween to receive the associated pawls, all but one of the grooves on one of the wheels being of depth relative to the associated pawl to maintain the other pawl free of the associated wheel, said one groove being of a depth to permit engagement of said other pawl with the associated wheel, a motor coupled to and driving said cam discs on said shafts to rotate therewith, each disc being provided with time designations, and means to inspect said designations and generate electrical signals corresponding therewith; said designations being in the form of radial arrays of holes, the latter said means comprising radial arrays of lamps and photoelectric cells fixed adjacent said discs to inspect said holes.

2. Apparatus comprising two shafts, ratchet wheels fixed on said shafts, a cam, an arm extending adjacent said wheels and engaging said cam, pawls on said arm and aligned with said wheels to engage the same, means engaging said arm to urge the pawls into engagement with the wheels, said wheels including evenly spaced peripheral teeth having grooves therebetween to receive the associated pawls, all but one of the grooves on one of the wheels being of depth relative to the associated pawl to maintain the other pawl free of the associated wheel, said one groove being of a depth to permit engagement of said other pawl with the associated wheel, a motor coupled to and driving said cam disc on said shafts to rotate therewith, each disc being provided with time designations, and means to inspect said designations and generate electrical signals corresponding therewith; said designations being in the form of radial arrays of holes, the latter said means comprising radial arrays of lamps and photoelectric cells fixed adjacent said discs to inspect said holes; said apparatus further comprising means to adjust said lamps and cells.

3. Apparatus comprising shafts, ratchet wheels fixed on each of said shafts, a cam, an arm extending adjacent said wheels and terminating adjacent said cam, a protrusion on said cam to displace said arm, pawls on said arm and aligned with said wheels to engage the same, a first and a second of said wheels being provided with evenly spaced peripheral teeth having grooves therebetween to receive the associated pawls, the third of said wheels also being provided with evenly spaced peripheral teeth having grooves therebetween to receive the associated pawl, all but one of the grooves on the first wheel being of depth relative to the associated pawl to maintain the other pawls free of the associated wheels, said one groove being of a depth to permit engagement of said other pawls with the associated wheels, all but one of the grooves of the second wheel being of a depth to maintain the third wheel and associated pawl out of engagement, the latter said one groove being of a depth to permit engagement of the third wheel and the pawl associated therewith when the pawl engaged with the first wheel is engaged with said one groove therein, a motor coupled to and driving said cam, discs on each of said shafts to rotate therewith, each disc being provided with a radially aligned array of holes adapted to represent in a predetermined code a time designation, and means to inspect said holes and generate electrical signals corresponding therewith.

4. Apparatus comprising a frame, parallel shafts rotatably supported on said frame, ratchet wheels fixed on selected of said shafts, a cam, an arm extending adjacent said wheels and terminating adjacent said cam, a roller on said arm adapted to engage said cam, a link pivotally mounted on said frame and pivotally coupled to said arm, a spring connected to said link and frame and adapted to urge said link in a direction to hold said roller against said cam, a protrusion on said cam to displace said roller and arm, pawls on said arm and aligned with said wheels to engage the same, a spring engaging said arm to urge the pawls into engagement with the wheels, a first and a second of said wheels being provided with evenly spaced peripheral teeth having grooves therebetween to receive the associated pawls, the third of said wheels also being provided with evenly spaced peripheral teeth having grooves therebetween to receive the associated pawl, all but one of the grooves on the first wheel being of depth relative to the associated pawl to maintain the other pawls free of the associated wheels, said one groove being of a depth to permit engagement of said other pawls with the associated wheels, all but one of the grooves of the second wheel being of a depth to maintain the third wheel and associated pawl out of engagement, the latter said one groove being of a depth to permit engagement of the third wheel and the pawl associated therewith when the pawl engaged with the first wheel is engaged with said one groove therein, a synchronous motor coupled to and driving said cam, the protrusion on said cam being of a height to rotate each of said wheels the distance of one tooth when the associated pawl is engaged therewith, units and tens discs on each of said shafts to rotate therewith, each disc being provided with a radially aligned array of holes adapted to represent in a predetermined code a time designation, and means adjacent each disc and adapted to inspect the same and generate electrical signals corresponding to time designation.

5. Apparatus comprising a frame, three parallel and coplanar shafts, means rotatably supporting said shafts on said frame, a further shaft parallel to the first said shafts and spaced from the plane of the latter, ratchet wheels fixed on each of said shafts, a cam fixed on said further shaft, an arm extending adjacent said wheels and terminating adjacent said cam, a roller on said arm adapted to engage said cam, a link pivotally mounted on said frame and pivotally coupled to said arm, a spring connected to said link and frame and adapted to urge said link in a direction to hold said roller against said cam, a protrusion on said cam to displace said roller and arm, the arm being displaced longitudinally by said wheels, pawls on said arm and aligned with said wheels to engage the same, a spring engaging said arm to urge the pawls into engagement with the wheels, a first and a second of said wheels being provided with sixty evenly spaced peripheral teeth having grooves therebetween to receive the associated pawls, the third of said wheels being provided with twenty-four evenly spaced peripheral teeth having grooves therebetween to receive the associated pawl, all but one of the grooves on the first wheel being of depth relative to the associated pawl to maintain the other pawls free of the associated wheels, said one groove being of a depth to permit engagement of said other pawls with the associated wheels, all but one of the grooves of the second wheel being of a depth to maintain the third wheel and associated pawl out of engagement, the latter said one groove being of a depth to permit engagement of the third wheel and the pawl associated therewith when the pawl engaged with the first wheel is engaged with said one groove therein, resilient arresting pawls engaged with said wheels for yieldingly holding the same in position, a synchronous motor coupled to and driving said one shaft at a speed of one rotation per second, the protrusion on said cam being of a height to rotate each of said wheels the distance of one tooth when the associated pawl is engaged therewith, a linkage system engaged with said arm for selectively displacing the pawls collectively out of engagement with said wheels, knobs on said three shafts for adjusting the same, units and tens discs on each of said shafts to rotate therewith, each disc being provided with a radially aligned array of holes adapted to represent in a predetermined code a time designation, and photoelectric units straddling each disc and including banks of light sources and photoelectric cells adapted to inspect said holes and generate electrical signals corresponding therewith.

6. Apparatus comprising a frame, three parallel and coplanar shafts, means rotatably supporting said shafts on said frame, a further shaft parallel to the first said shafts and spaced from the plane of the latter, ratchet wheels fixed on each of said shafts, a cam fixed on said further shaft, an arm extending adjacent said wheels and terminating adjacent said cam, a roller on said arm adapted to engage said cam, a link pivotally mounted on said frame and pivotally coupled to said arm, a spring connected to said link and frame and adapted to urge said link in a direction to hold said roller against said cam, a protrusion on said cam to displace said roller and arm, the arm being displaced longitudinally by said wheels, pawls on said arm and aligned with said wheels to engage the same, a spring engaging said arm to urge the pawls into engagement with the wheels, a first and a second of said wheels being provided with sixty evenly spaced peripheral teeth having grooves therebetween to receive the associated pawls, the third of said wheels being provided with twenty-four evenly spaced peripheral teeth having grooves therebetween to receive the associated pawl, all but one of the grooves on the first wheel being of depth relative to the associated pawl to maintain the other pawls free of the associated wheels, said one groove being of a depth to permit engagement of said other pawls with the associated wheels, all but one of the grooves of the second wheel being of a depth to maintain the third wheel and associated pawl out of engagement, the latter said one groove being of a depth to permit engagement of the third wheel and the pawl associated therewith when the pawl engaged with the first wheel is engaged with said one groove therein, resilient arresting pawls engaged with said wheels yieldingly holding the same in position, a synchronous motor coupled to and driving said one shaft at a speed of one rotation per second, the protrusion on said cam being of a height to rotate each of said wheels the distance of one tooth when the associated pawl is engaged therewith, a linkage system engaged with said arm for selectively displacing the pawls collectively out of engagement with said wheels, knobs on said three shafts for adjusting the same, units and tens discs on each of said shafts to rotate therewith, each disc being provided with a radially aligned array of holes adapted to represent in a predetermined code a corresponding one of said teeth, photoelectric units straddling each disc and including banks of light sources and photoelectric cells adapted to inspect said holes and generate electrical signals corresponding therewith, gating means coupled to said cells and adapted to receive signals therefrom, a sequencer disc on said further shaft and having holes distributed angularly thereabout, a photoelectric unit straddling said sequencer disc and including light sources and photoelectric cells adapted to generate a sequence of electrical signals upon detecting the latter said holes, selected of the latter said cells being adapted to prime said gating means to pass signals received from the first said cells, and a sequencer control means coupled to one of the latter said cells and responsive thereto and to an external signal to couple said selected cells to said gating means for sequentially passing through signals generated in the first said cells.

7. Apparatus comprising a frame, three parallel and coplanar shafts, means rotatably supporting said shafts on said frame, a further shaft parallel to the first said shafts and spaced from the plane of the latter, ratchet wheels fixed on each of said shafts, a cam fixed on said further shaft, an arm extending adjacent said wheels and terminating adjacent said cam, a roller on said arm adapted to engage said cam, a link pivotally mounted on said frame and pivotally coupled to said arm, a spring connected to said link and frame and adapted to urge said link in a direction to hold said roller against said cam, a protrusion on said cam to displace said roller and arm, the arm being displaced longitudinally by said wheels, pawls on said arm and aligned with said wheels to engage the same, a spring engaging said arm to urge the pawls into engagement with the wheels, a first and a second of said wheels being provided with sixty evenly spaced peripheral teeth having grooves therebetween to receive the associated pawls, the third of said wheels being provided with twenty-four evenly spaced peripheral teeth having grooves therebetween to receive the associated pawl, all but one of the grooves on the first wheel being of depth relative to the associated pawl to maintain the other pawls free of the associated wheels, said one groove being of a depth to permit engagement of said other pawls with the associated wheels, all but one of the grooves of the second wheel being of a depth to maintain the third wheel and associated pawl out of engagement, the latter said one groove being of a depth to permit engagement of the third wheel and the pawl associated therewith when the pawl engaged with the first wheel is engaged with said one groove therein, resilient arresting pawls engaged with said wheels for yieldingly holding the same in position, a synchronous motor coupled to and driving said one shaft at a speed of one rotation per second, the protrusion on said cam being of a height to rotate each of said wheels the distance of one tooth when the associated pawl is engaged therewith, a linkage system engaged with said arm for selectively displacing the pawls collectively out of engagement with said wheels, knobs on said three shafts for adjusting the same, units and tens discs on each of said shafts to rotate therewith, each disc being provided with a radially aligned array of holes adapted to represent in a predetermined code a time designation, photoelectric units straddling each disc and including banks of light sources and photoelectric cells adapted to inspect said holes and generate electrical signals corresponding therewith, gating means coupled to said cells and adapted to receive signals therefrom, a sequencer disc on said further shaft and having holes distributed angularly thereabout, a photoelectric unit straddling said sequencer disc and including light sources and photoelectric cells adapted to generate a sequence of electrical signals upon detecting the latter said holes, selected of the latter said cells being adapted to prime said gating means to pass signals received from the first said cells, a sequencer control means coupled to one of the latter said cells and responsive thereto and to an external signal to couple said selected cells to said gating means for sequentially passing through signals generated in the first said cells, and further discs on said three shafts and bearing visible indicia identifying said arrays of holes, said frame concealing substantial portions of said further discs and having openings to expose the visible indicia corresponding to the arrays being inspected by the associated photoelectric units.

References Cited by the Examiner

UNITED STATES PATENTS

| | | | |
|---|---|---|---|
| 1,618,242 | 2/1927 | Thompson | 250—219 X |
| 2,423,991 | 6/1947 | Mumma | 235—134 |
| 2,722,382 | 11/1955 | Kihl et al. | 235—134 |
| 2,902,679 | 9/1959 | DePhillipo et al. | 235—92 |
| 3,037,077 | 5/1962 | Williams et al. | |
| 3,040,984 | 6/1962 | Cox et al. | 235—92 |
| 3,114,081 | 12/1963 | Whipple | 250—233 X |
| 3,198,966 | 8/1965 | Roberts | 250—233 X |

FOREIGN PATENTS

| | | |
|---|---|---|
| 439,035 | 11/1935 | Great Britain. |

RALPH G. NILSON, *Primary Examiner.*

WALTER STOLWEIN, *Assistant Examiner.*